United States Patent
Eisenhower, Jr. et al.

(10) Patent No.: US 7,967,348 B2
(45) Date of Patent: Jun. 28, 2011

(54) KEY ALIGNMENT SYSTEM FOR KEYED SAFETY INTERLOCKS

(75) Inventors: Gary W. Eisenhower, Jr., Freeport, IL (US); Jeffrey S. Hall, Winnebago, IL (US); Mark A. Mantua, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 903 days.

(21) Appl. No.: 11/973,958

(22) Filed: Oct. 10, 2007

(65) Prior Publication Data

US 2009/0095037 A1    Apr. 16, 2009

(51) Int. Cl.
E05B 15/02    (2006.01)
E05C 1/04    (2006.01)

(52) U.S. Cl. ............. 292/341.18; 292/150; 292/DIG. 55

(58) Field of Classification Search ........... 292/341.11–341.13, 341.18, 341.15, 292/341.16, 341.19, 144, 340, DIG. 51, DIG. 55, 292/DIG. 61, 146, 150, DIG. 68; 49/279, 49/280
See application file for complete search history.

(56) References Cited

U.S. PATENT DOCUMENTS

| | | | | |
|---|---|---|---|---|
| 1,475,725 A | * | 11/1923 | Steinmark | 292/150 |
| 1,768,021 A | * | 6/1930 | Bauerband | 70/282 |
| 2,583,391 A | * | 1/1952 | Quinn | 292/341.15 |
| 2,817,554 A | * | 12/1957 | Hasselmark | 292/340 |
| 3,441,303 A | * | 4/1969 | Tabor | 292/306 |
| 4,480,862 A | * | 11/1984 | Fleming | 292/162 |
| 4,535,870 A | * | 8/1985 | Lindsay | 181/141 |
| 4,540,208 A | * | 9/1985 | Logan et al. | 292/341.19 |
| 4,613,176 A | * | 9/1986 | Kelly | 292/201 |
| 4,717,794 A | * | 1/1988 | Paul et al. | 200/50.1 |
| 4,915,428 A | * | 4/1990 | Hayakawa | 292/29 |
| 5,226,302 A | * | 7/1993 | Anderson | 70/159 |
| 5,595,409 A | * | 1/1997 | Fier et al. | 292/112 |
| 5,672,857 A | | 9/1997 | Frost et al. | |
| 5,775,749 A | * | 7/1998 | Reithmeyer et al. | 292/341.18 |
| 6,149,213 A | * | 11/2000 | Sokurenko et al. | 292/340 |
| 6,931,897 B2 | * | 8/2005 | Talpe | 70/210 |
| 7,347,069 B2 | * | 3/2008 | Talpe | 70/107 |
| 7,416,228 B2 | * | 8/2008 | Pfitzinger et al. | 292/216 |
| 2001/0032778 A1 | | 10/2001 | Kajio et al. | |
| 2007/0204662 A1 | | 9/2007 | Pullmann et al. | |

FOREIGN PATENT DOCUMENTS

| | | |
|---|---|---|
| JP | 2002-050262 A | 2/2002 |
| JP | 2007-207575 A | 8/2007 |

* cited by examiner

*Primary Examiner* — Carlos Lugo
*Assistant Examiner* — Alyson M Merlino
(74) *Attorney, Agent, or Firm* — Ingrassia Fisher & Lorenz, P.C.

(57) ABSTRACT

A key alignment system for safety interlock switches uses alignment holes, and alignment pins to compensate for misalignment between a body assembly and a key assembly. The misalignment is often due to normal wear and tear or outright abuse of a gate or other movable member that should be safely interlocked. The key is fixed to a floating plate connected to a mounting plate by a suspension. The alignment pins and holes on or in a fixed alignment assembly and the floating plate can move the floating plate into a position such that the key enters the key hole. Some embodiments incorporate the fixed alignment assembly into the body assembly. The normal function of a keyed safety interlock wherein the key can be caught and held or released is preserved and enhanced by compensating for misalignment.

17 Claims, 4 Drawing Sheets

KEY ALIGNMENT SYSTEM FOR KEYED SAFETY INTERLOCKS

TECHNICAL FIELD

Embodiments relate to safety interlocks, trap and hold mechanisms. Embodiments also relate to electromechanical systems, electromechanical actuators, and solenoids. Embodiments further relate to self alignment and mechanical suspensions.

BACKGROUND OF THE INVENTION

Safety interlock switches are used in industrial settings to lock entryways or to cut machinery power unless a person takes a positive action such as pressing a button. For example, a gate can deny access to a mine shaft. The gate can automatically swing shut and lock when it is not held open by a person or object. This is a desirable feature because it denies access to the unwary and to the uninvited. Another example is that the access to a large press can be denied when the press is energized.

Gates can sag on their hinges because either the gate is too heavy or because something heavy, such as a person, hangs on the gate while it is open. Sagging gates often fail to close unless physically lifted. Sagging or misaligned gates can also be closed when an alignment mechanism compensates for the misalignment by lifting or shifting the entire gate, which can require great strength.

Current solutions require considerable force or strength for continued gate operation with the end result that misaligned gates are often left unlatched. Unlatched gates are merely inconvenient in some environments. In other environments, an unlatched gate is a safety hazard or a security breach. Systems and methods for easily latching misaligned gates are needed.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of the embodiments that a safety interlock switch has a body assembly and a key assembly. The body assembly has a key hole and the key assembly has a key attached to a floating plate. A suspension connects the floating plate to a mounting plate. The suspension allows the floating plate to move in two dimensions relative to the mounting plate to compensate for misalignment such that the key can enter the keyhole.

It is also an aspect of the embodiments that alignment pins moving into alignment holes can cause the floating plate to shift and thereby align the key with the keyhole. The alignment pins can be fixed to the floating plate, body assembly, or a fixed alignment assembly. Alignment pins fixed to the floating plate enter into alignment holes in the body assembly or in the fixed alignment assembly. Alternatively, alignment holes in the floating plate can be entered by alignment pins connected to the body assembly or to the fixed alignment assembly.

BRIEF DESCRIPTION OF THE DRAWINGS

The accompanying figures, in which like reference numerals refer to identical or functionally similar elements throughout the separate views and which are incorporated in and form a part of the specification, further illustrate aspects of the embodiments and, together with the background, brief summary, and detailed description serve to explain the principles of the embodiments.

DETAILED DESCRIPTION

The particular values and configurations discussed in these non-limiting examples can be varied and are cited merely to illustrate at least one embodiment and are not intended to limit the scope thereof. In general, the figures are not to scale.

A key alignment system for safety interlock switches uses alignment holes, and alignment pins to compensate for misalignment between a body assembly and a key assembly. The misalignment is often due to normal wear and tear or outright abuse of a gate or other movable member that should be safely interlocked. The key is fixed to a floating plate connected to a mounting plate by a suspension. The alignment pins and holes on or in a fixed alignment assembly and the floating plate can move the floating plate into a position such that the key enters the key hole. Some embodiments incorporate the fixed alignment assembly into the body assembly. The normal function of a keyed safety interlock wherein the key can be caught and held or released is preserved and enhanced by compensating for misalignment.

Figure 1:
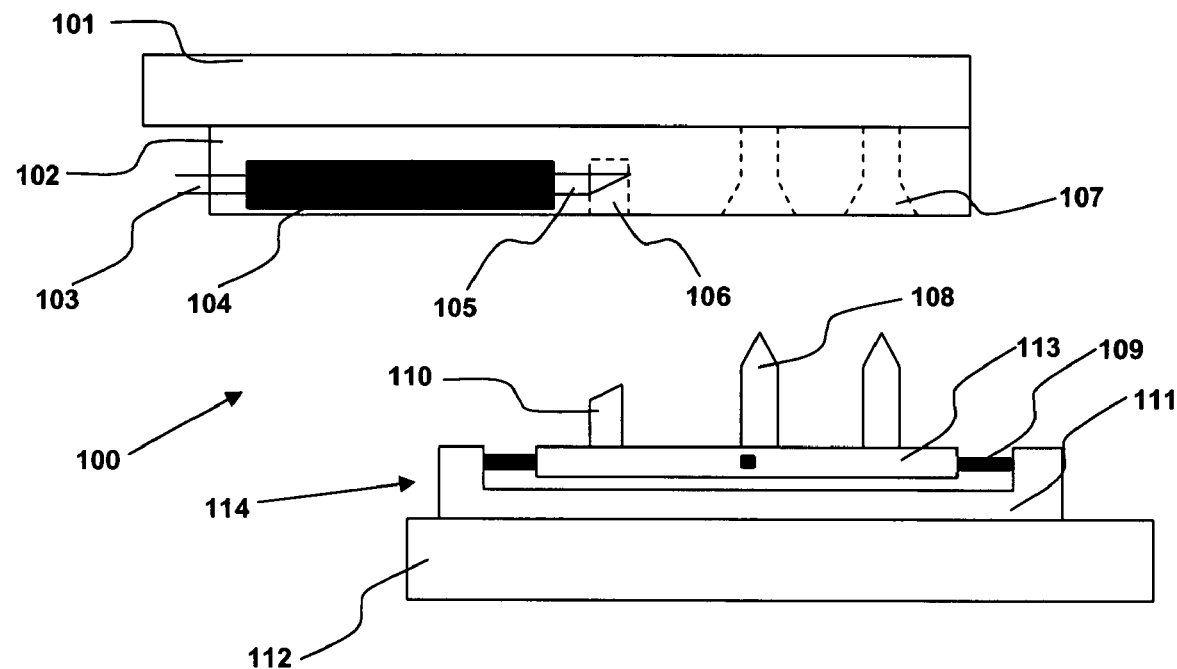
FIG. 1 illustrates a safety interlock switch in accordance with aspects of the embodiments.

FIG. 1 illustrates a key alignment system for a keyed safety interlock switch 100 in accordance with aspects of the embodiments. A body assembly 102 can be attached to a frame 101 and a key assembly 114 can be attached to a gate 112. Alignment pins 108 enter into alignment holes 107 when the gate 112 is shut against the frame 101. Notice that the alignment pins 108 are illustrated as pointed and that the alignment holes 107 are illustrated as countersunk to facilitate the alignment pins 108 entering the alignment holes 107 when the gate 112 and frame 101 are misaligned.

The key assembly 114 has a mounting plate 111 attached to the gate while a suspension made of springs 109 allows the floating plate 113 to move in two dimensions relative to the mounting plate 111. In FIG. 1, those two dimensions are left-right and in and out (of the page) but not up down. Movement of the floating plate allows a key 110 attached to the floating plate 113 to enter into a key hole 106 in the body assembly 102. A solenoid 104 can extend and retract a plunger 105 to trap and hold or to release the key. The solenoid can receive electrical power from wires 103.

Figure 2:
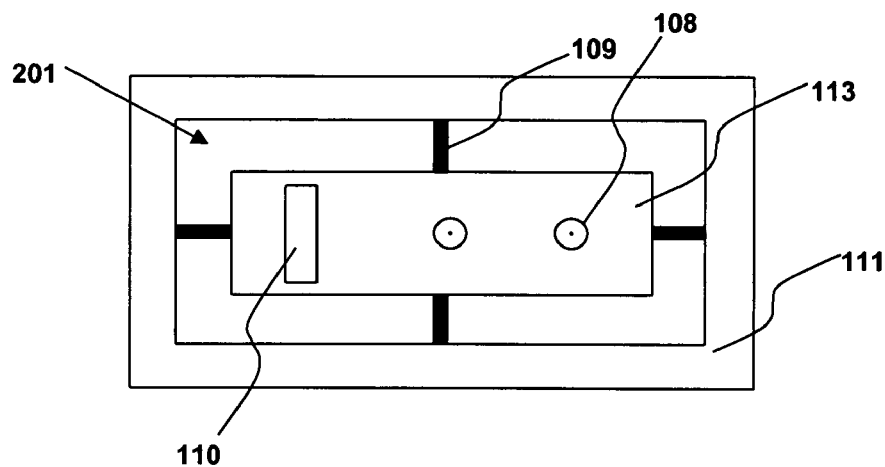
FIG. 2 illustrates a floating plate, coil spring suspension, and mounting plate with the coil springs on the sides in accordance with aspects of the embodiments.

FIG. 2 illustrates a floating plate 113 suspended from a mounting plate 111 by coil springs 109 on the sides in accordance with aspects of the embodiments. FIG. 2 is a top view of the key assembly 114 of FIG. 1. Four coil springs 109 comprise the suspension 201. In this top view the floating plate can move up-down and left right but not into and out of the page. As such, the floating plate 113 can move in two directions relative to the mounting plate 111 and those two dimensions are coplanar with the page and perpendicular to the long axis of the alignment pins 108.

Figure 3:
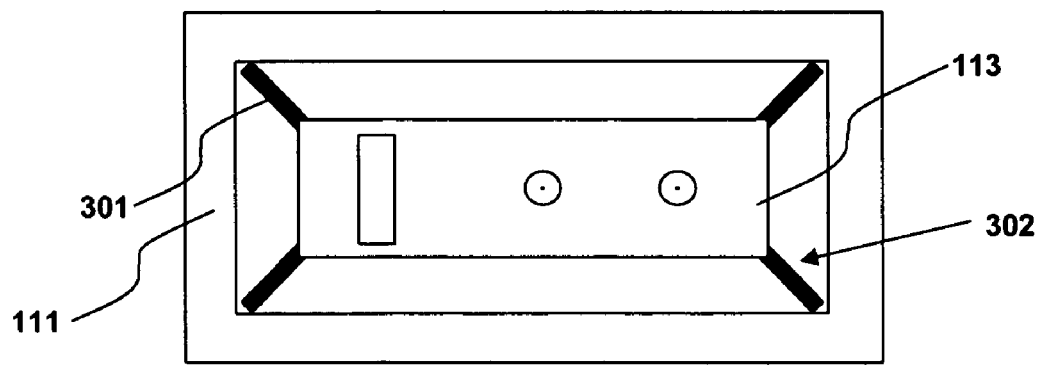
FIG. 3 illustrates a floating plate, coil spring suspension, and mounting plate with coil springs in the corners in accordance with aspects of the embodiments.

FIG. 3 illustrates a floating plate 113 suspended from a mounting plate 111 by coil springs 301 in the corners in accordance with aspects of the embodiments. FIG. 3 illustrates a four spring suspension 302 very similar to that of FIG. 2.

Figure 4:
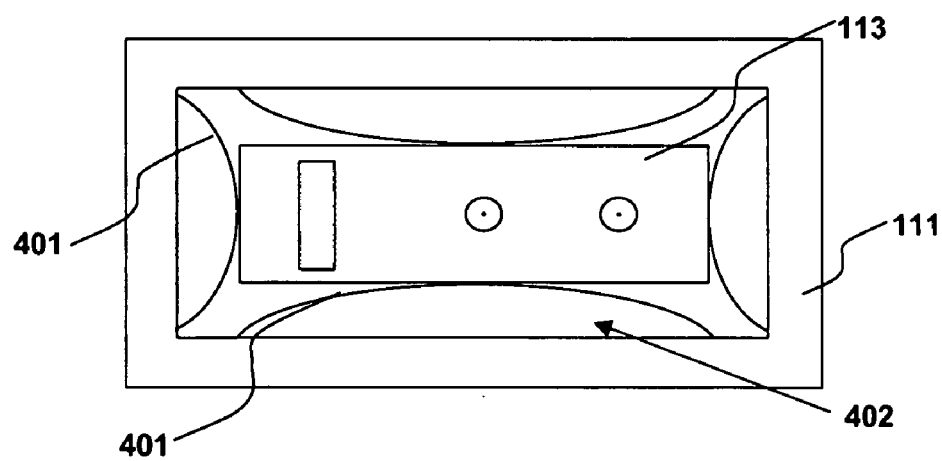
FIG. 4 illustrates a floating plate, leaf spring suspension, and mounting plate in accordance with aspects of the embodiments.

FIG. 4 illustrates a floating plate 113 suspended from a mounting plate 111 by leaf springs 401 in accordance with aspects of the embodiments. The four leaf springs 401 form a leaf spring suspension 402.

Figure 5:
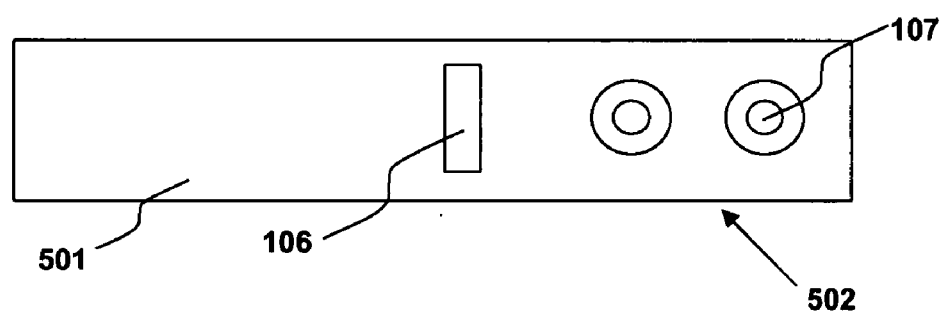
FIG. 5 illustrates a body assembly with attached fixed alignment assembly in accordance with aspects of the embodiments.

FIG. 5 illustrates a body assembly 501 with attached fixed alignment assembly 502 in accordance with aspects of the embodiments. The fixed alignment assembly is the area of the body assembly 501 having alignment holes 107.

Figure 6:
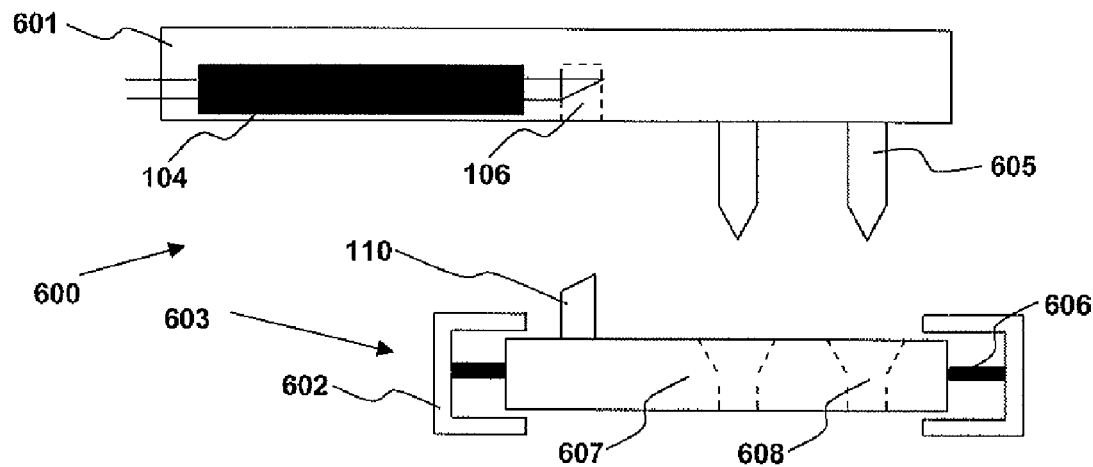
FIG. 6 illustrates a safety interlock switch in accordance with aspects of the embodiments.

FIG. 6 illustrates a key alignment system 600 for a keyed safety interlock switch in accordance with aspects of the embodiments. The body assembly 601 has alignment pins 605 that can go into alignment holes 608 in the floating plate 607. A suspension of coil springs 606 allows the floating plate to move within the mounting plate 602. The floating plate 607, however, is also captured by the mounting plate 602 in that the floating plate can not escape from the mounting plate 602. Notice that the suspension could also use leaf springs.

Figure 7:
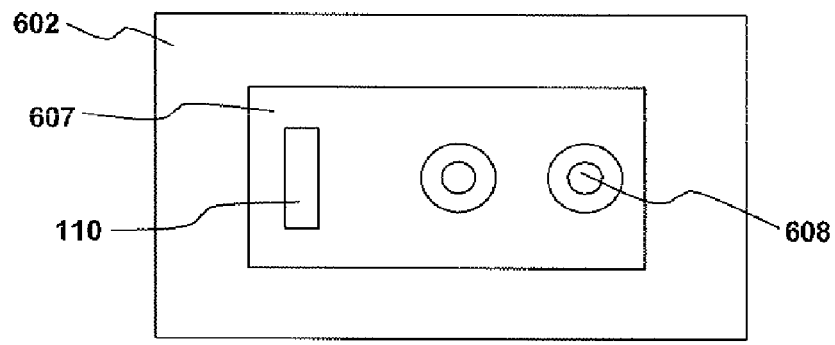
FIG. 7 illustrates a captured floating plate, coil spring suspension, and mounting plate in accordance with aspects of the embodiments.

FIG. 7 illustrates a captured floating plate 607 suspended from a mounting plate 602 in accordance with aspects of the embodiments. The key assembly 603 of FIG. 7 is a top view of the key assembly 603 of FIG. 6. The springs of the suspension can not be seen because the view is occluded by the mounting plate 602.

Figure 8:
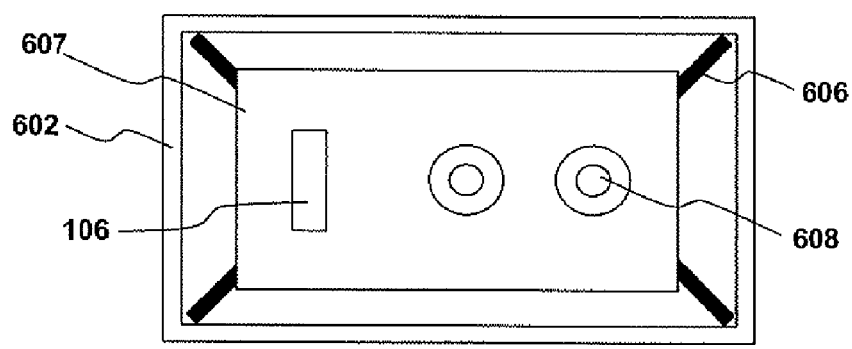
FIG. 8 illustrates a cut view of a captured floating plate, coil spring suspension, and mounting plate in accordance with aspects of the embodiments.

FIG. 8 illustrates a cut view of a captured floating plate 607 suspended from a mounting plate 602 by coil springs 606 in the corners in accordance with aspects of the embodiments. The key assembly 603 of FIG. 8 is a cut view and top view of the key assembly 603 of FIGS. 6 and 7. The springs of the suspension can now be seen because the view is cut such that the suspension is not occluded by the mounting plate 602.

Figure 9:
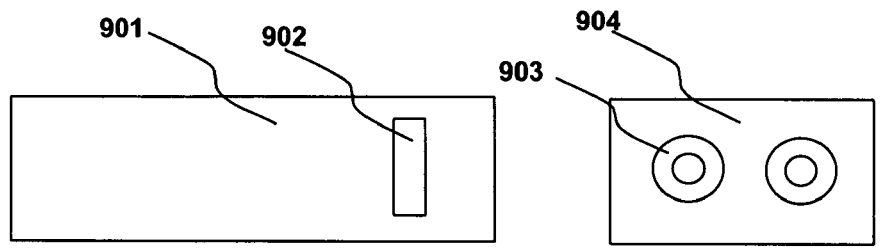
FIG. 9 illustrates a body assembly with a separate fixed alignment assembly in accordance with aspects of the embodiments.

FIG. 9 illustrates a body assembly 901 with a separate fixed alignment assembly 904 in accordance with aspects of the embodiments. The body assembly 901 has the key hole 902 along with any internal mechanism such as a solenoid. The alignment assembly 904 has alignment holes 903. Both the body assembly 901 and the alignment assembly 904 can be fixed to a frame or gate such that they do not move in relation to one another. A key assembly's floating plate can then use the fixed alignment assembly to align a key with the key hole 902.

Figure 10:
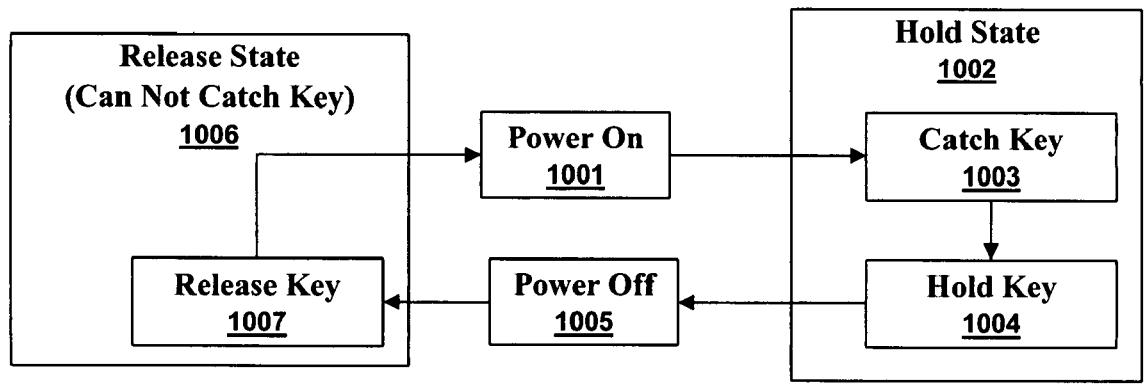
FIG. 10 illustrates a high level state diagram of a fail open catch and release body assembly in accordance with aspects of the embodiments.

FIG. 10 illustrates a high level state diagram of a fail open catch and release body assembly in accordance with aspects of the embodiments. Applying power 1001 puts the body assembly into the hold state 1002. In the hold state 1002, a key can enter the key hole, perhaps pushing past a solenoid plunger, but can not exit the key hole. In the catch key 1003 substate, no key is caught in the key hole, but any key pressed into the key hole will be caught. In the hold key 1004 substate a key is in the key hole and will not be released. When power is turned off 1005 the body assembly moves into the release state 1006, perhaps by retracting a solenoid plunger. If a key had been captured, it is released 1007. A key will not be caught while the body assembly is in the release state 1006.

The state diagram of FIG. 10 is called "fail open" because when electrical power fails the system goes into the release state. A "fail closed" version would transition into the hold state when electrical power is removed from the system.

Figure 11:
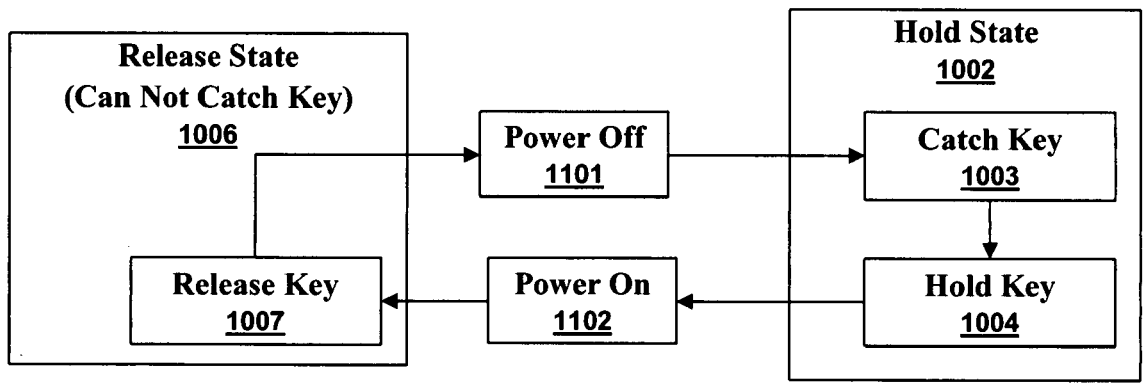
FIG. 11 illustrates a high level state diagram of a fail closed catch and release body assembly in accordance with aspects of the embodiments.

FIG. 11 illustrates a high level state diagram of a fail closed catch and release body assembly in accordance with aspects of the embodiments. The difference between FIG. 11 and FIG. 10 is that the "Power Off" and "Power On" blocks have traded places. As such, applying power 1102 puts the body assembly into the release state 1006 whereas removing power 1101 puts it into the hold state 1002.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system comprising:
a keyed safety interlock comprising a body assembly and a key assembly wherein the body assembly comprises a locking member and a keyhole and wherein the key assembly comprises a key, at least one alignment pin, a floating plate, and a mounting plate; and
a fixed alignment assembly comprising at least one alignment hole;
wherein the key and the at least one alignment pin are fixedly attached to the floating plate, and wherein the floating plate is attached to and suspended from the mounting plate by a plurality of springs that provide the floating plate with limited two dimensional travel with respect to the mounting plate;
wherein the body assembly has a multiplicity of states comprising a hold state and a release state, wherein the locking member traps the key in the keyhole and does not release the key from the keyhole when the body assembly is in the hold state, and wherein the key is free to enter and exit the keyhole when the body assembly is in the release state; and
wherein pressing the at least one alignment pin into the at least one alignment hole causes the floating plate to move and to thereby align the key to the keyhole.

2. The system of claim 1 wherein the body assembly further comprises the fixed alignment assembly.

3. The system of claim 1 wherein the plurality of springs comprises at least one coil spring.

4. The system of claim 1 wherein the plurality of springs comprises at least one leaf spring.

5. The system of claim 1 wherein the locking member is movable by an electromechanical device wherein the body assembly enters and stays in the release state only when the electromechanical device receives electrical power.

6. The system of claim 5 wherein the electromechanical device is a solenoid.

7. The system of claim 1 wherein the locking member is movable by an electromechanical device wherein the body assembly enters and stays in the release state only when the electromechanical device is de-energized.

8. The system of claim 7 wherein the electromechanical device is a solenoid.

9. The system of claim 1 further comprising:
- a frame and a gate wherein the body assembly is fixedly attached to the frame and wherein the mounting plate is fixedly attached to the gate;
- wherein the body assembly further comprises the fixed alignment assembly;
- wherein the plurality of springs comprises at least one leaf spring; and
- wherein the body assembly comprises a solenoid wherein the body assembly enters and stays in the release state only when the solenoid receives electrical power.

10. A system comprising:
- a keyed safety interlock comprising a body assembly and a key assembly wherein the body assembly comprises a locking member, at least one alignment pin and a keyhole and wherein the key assembly comprises a key, a floating plate comprising at least one alignment hole, and a mounting plate;
- wherein the key is fixedly attached to the floating plate, and wherein the floating plate is attached to the mounting plate by a plurality of springs that provide the floating plate with limited two dimensional travel with respect to the mounting plate;
- wherein the body assembly has a multiplicity of states comprising a hold state and a release state, wherein the locking member traps the key in the keyhole and does not release the key from the keyhole when the body assembly is in the hold state, and wherein the key is free to enter and exit the keyhole when the body assembly is in the release state; and
- wherein pressing the at least one alignment pin into the at least one alignment hole causes the floating plate to move with respect to the mounting plate and to thereby align the key to the keyhole.

11. The system of claim 10 wherein the plurality of springs comprises at least one coil spring.

12. The system of claim 10 wherein the plurality of springs comprises at least one leaf spring.

13. The system of claim 10 wherein the locking member is movable by an electromechanical device wherein the body assembly enters and stays in the release state only when the electromechanical device receives electrical power.

14. The system of claim 13 wherein the electromechanical device is a solenoid.

15. The system of claim 10 wherein the locking member is movable by an electromechanical device wherein the body assembly enters and stays in the release state only when the electromechanical device is de-energized.

16. The system of claim 15 wherein the electromechanical device is a solenoid.

17. The system of claim 1 further comprising:
- a frame and a gate wherein the body assembly is fixedly attached to the frame and wherein the mounting plate is fixedly attached to the gate;
- wherein the plurality of springs comprises at least one leaf spring; and
- wherein the body assembly comprises a solenoid wherein the body assembly enters and stays in the release state only when the solenoid receives electrical power.

* * * * *